(12) United States Patent
Lan et al.

(10) Patent No.: US 10,861,169 B2
(45) Date of Patent: Dec. 8, 2020

(54) METHOD, STORAGE MEDIUM AND ELECTRONIC DEVICE FOR GENERATING ENVIRONMENT MODEL

(71) Applicant: GUANGDONG OPPO MOBILE TELECOMMUNICATIONS CORP., LTD., Guangdong (CN)

(72) Inventors: He Lan, Guangdong (CN); Xiao Tan, Guangdong (CN); Jian Wang, Guangdong (CN); Kui Zou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/196,656

(22) Filed: Nov. 20, 2018

(65) Prior Publication Data
US 2019/0295265 A1 Sep. 26, 2019

(30) Foreign Application Priority Data
Mar. 26, 2018 (CN) .......................... 2018 1 0252890

(51) Int. Cl.
*G06T 7/246* (2017.01)
*G06T 7/285* (2017.01)
*G06T 17/00* (2006.01)

(52) U.S. Cl.
CPC .............. *G06T 7/246* (2017.01); *G06T 7/285* (2017.01); *G06T 17/00* (2013.01)

(58) Field of Classification Search
CPC ...................................................... G06T 17/00
See application file for complete search history.

(56) References Cited

U.S. PATENT DOCUMENTS 9,773,313 B1 9/2017 Klingner et al.
2007/0093945 A1 4/2007 Grzywna
(Continued)

FOREIGN PATENT DOCUMENTS

| CN | 104036476 | 9/2014 |
| CN | 104050712 | 9/2014 |

(Continued)

OTHER PUBLICATIONS

SIPO, First Office Action for CN Application No. 201810252890.3, dated Oct. 31, 2019.
(Continued)

*Primary Examiner* — Phi Hoang
(74) *Attorney, Agent, or Firm* — Hodgson Russ LLP (57) ABSTRACT

Embodiments of the present disclosure provide a method for generating an environment model, a storage medium and an electronic device. The method includes the following. A plurality of images is acquired for an environment where the electronic device is located. The plurality of images is corresponding to a plurality of acquisition moments. Motion data of the electronic device is acquired at the plurality of acquisition moments. The plurality of images and the motion data at the plurality of acquisition moments are analyzed to generate three-dimensional spatial data of the environment. The plurality of images is packaged with the three-dimensional spatial data to generate an environment model.

9 Claims, 8 Drawing Sheets

(56) References Cited

U.S. PATENT DOCUMENTS

| | | |
|---|---|---|
| 2014/0168212 A1 | 6/2014 | Jones |
| 2014/0204077 A1 | 7/2014 | Kamuda et al. |
| 2015/0070352 A1* | 3/2015 | Jones .................... G06T 7/75 |
| | | 345/420 |
| 2015/0109415 A1 | 4/2015 | Son et al. |
| 2016/0232277 A1* | 8/2016 | Zmijewski .............. G06F 30/17 |
| 2018/0220125 A1* | 8/2018 | Tamir .................... G06T 19/003 |

FOREIGN PATENT DOCUMENTS

| | | |
|---|---|---|
| CN | 106373187 | 2/2017 |
| CN | 106843790 | 6/2017 |
| CN | 106846497 | 6/2017 |
| CN | 106856566 | 6/2017 |
| CN | 107146278 | 9/2017 |
| CN | 107209950 | 9/2017 |
| CN | 107393017 | 11/2017 |
| CN | 107464283 | 12/2017 |
| CN | 107808123 | 3/2018 |
| CN | 108537878 | 9/2018 |
| EP | 3483839 A1 * | 5/2019 ......... G01B 11/2545 |

OTHER PUBLICATIONS

Feng et al., "Monocular Visual-Inertial State Estimation with Online Temporal Calibration," Ubiquitous Positioning, Indoor Navigation and Location-Based Services IEEE, 2018, pp. 1-8.

EPO, Office Action for EP Application No. 18214555, dated Jul. 1, 2019.

WIPO, English translation of the ISR and WO for PCT/CN2019/074016, May 5, 2019.

SIPO, Notice of Registration for CN Application No. 201810252890.3, Mar. 20, 2020.

* cited by examiner

METHOD, STORAGE MEDIUM AND ELECTRONIC DEVICE FOR GENERATING ENVIRONMENT MODEL

CROSS REFERENCE TO RELATED APPLICATION

This application claims priority to Chinese Patent Application No. 201810252890.3, filed on Mar. 26, 2018, the entire disclosure of which is incorporated herein by reference.

TECHNICAL FIELD

The present disclosure relates to a field of electronic device technologies, and more particularly, to a method for generating an environment model, an apparatus for generating an environment model, a storage medium and an electronic device.

BACKGROUND

Augmented Reality (AR) technology synthesizes a real-world environment seen by a user with a virtual environment including additional information and displays a synthesized image. AR technology that complements the real-world environment with the virtual environment, employs computer graphics to create the virtual environment. Computer graphics additionally provides information necessary for the real-world environment.

In AR technology, computer graphics needs to provide the information necessary for the real-world environment, thereby requiring to recognize the real-world environment.

SUMMARY

Embodiments of the present disclosure provide a method for generating an environment model. The method is applicable to an electronic device. The method includes the following. A plurality of images is acquired for an environment where the electronic device is located. The plurality of images is corresponding to a plurality of acquisition moments. Motion data of the electronic device is acquired at the plurality of acquisition moments. The plurality of images and the motion data at the plurality of acquisition moments are analyzed to generate three-dimensional spatial data of the environment. The plurality of images is packaged with the three-dimensional spatial data to generate an environment model.

Embodiments of the present disclosure further provide an electronic device. The electronic device includes a memory and a processor. The memory is configured to store computer programs. The processor is configured to implement the above method by invoking the computer programs stored in the memory.

Embodiments of the present disclosure further provide a storage medium having stored computer programs thereon. When the computer programs are running in a computer, the computer is caused to implement the above method.

BRIEF DESCRIPTION OF THE DRAWINGS

To clearly illustrate embodiments of the present disclosure, a brief description of drawings used in embodiments is given below. Obviously, the drawings in the following descriptions are only part embodiments of the present disclosure, and for those skilled in the art, other drawings may be obtained based on these drawings without creative labor.

DETAILED DESCRIPTION

The technical solutions in the embodiments of the present disclosure are clearly and completely described in the following with reference to the drawings in the embodiments of the present disclosure. It is apparent that the described embodiments are only a part of the embodiments of the present disclosure, and not all of them. Based on the embodiments in the present disclosure, all other embodiments obtained by those skilled in the art without creative efforts are within the scope of the present disclosure.

Terms "first", "second", "third (if present)", etc. in the specification and claims of the present disclosure and the above drawings are used to distinguish similar objects, and are not necessarily used for descripting a specific order. The objects so described are interchangeable where appropriate. Moreover, terms "comprising" and "containing" and any variations thereof are intended to cover a non-exclusive inclusion. For example, a process and a method comprising a series of actions, or an apparatus, an electronic device and a system comprising a series of modules or units, are not necessarily limited to those actions or modules or units that are clearly listed, and may further comprise actions or modules or units that are not explicitly listed, and may further comprise other actions or modules or units inherent to the process, method, apparatus, electronic device or system.

The present disclosure relates to a method for generating an environment model. The method is applicable to an electronic device. The method includes the following: acquiring a plurality of images for an environment where the electronic device is located, the plurality of images being corresponding to a plurality of acquisition moments; acquiring motion data of the electronic device at the plurality of acquisition moments; analyzing the plurality of images and the motion data at the plurality of acquisition moments to generate three-dimensional spatial data of the environment; and packaging the plurality of images with the three-dimensional spatial data to generate an environment model.

The present disclosure relates to an apparatus for generating an environment model. The apparatus is applicable to an electronic device. The apparatus includes a first acquiring module, a second acquiring module, a data analyzing module and a model generating module. The first acquiring module is configured to acquire a plurality of images for an environment where the electronic device is located. The plurality of images is corresponding to a plurality of acquisition moments. The second acquiring module is configured to acquire motion data of the electronic device at the plurality of acquisition moments. The data analyzing module is configured to analyze the plurality of images and the motion data at the plurality of acquisition moments to generate three-dimensional spatial data of the environment. The model generating module is configured to package the plurality of images with the three-dimensional spatial data to generate an environment model.

The present disclosure relates to a storage medium having stored computer programs thereon. When the computer programs are running in a computer, the computer is caused to implement the above method.

The present disclosure relates to an electronic device. The electronic device includes a memory and a processor. The memory is configured to store computer programs. The processor is configured to implement the above method by invoking the computer programs stored in the memory.

The method for generating an environment model provided in the embodiments of the present disclosure may be applicable to an apparatus for generating an environment model provided in the embodiments of the present disclosure. The apparatus for generating an environment model may be disposed in an electronic device.

Figure 1:
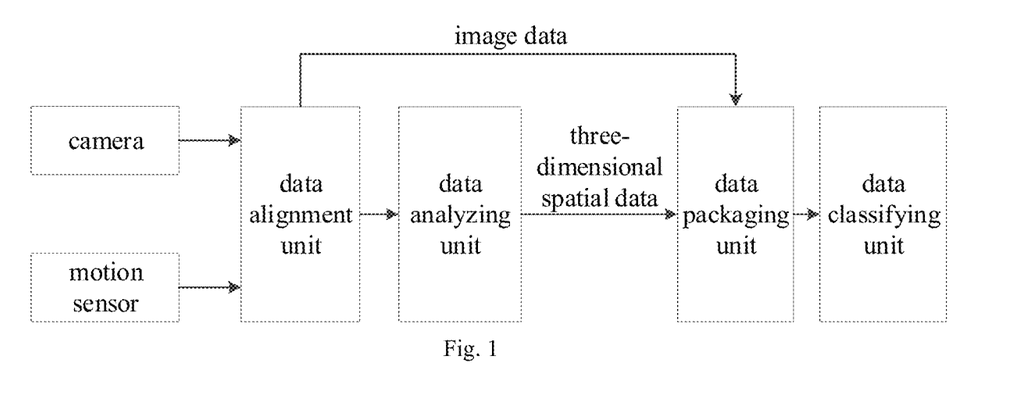
FIG. 1 is a block diagram illustrating a hardware structure of an apparatus for generating an environment model according to an embodiment of the present disclosure.

FIG. 1 is a block diagram illustrating a hardware structure of the apparatus for generating an environment model. The apparatus for generating an environment model may include a camera, a motion sensor, a data alignment unit, a data analyzing unit, a data packaging unit, and a data classifying unit.

In one or more embodiments, the camera may be configured to capture an environment where the electronic device is located to acquire an image of the environment. In one or more embodiments, the camera may be configured to capture the environment continuously, i.e., capture a video of the environment.

In one or more embodiments, the motion sensor may include a gyroscope (also referred to as an angular velocity sensor), an acceleration sensor (also referred to as a gravity sensor), and the like. The motion sensor may detect motion of the electronic device and acquire motion data of the electronic device. In one or more embodiments, the motion data may include an acceleration, an angular velocity and an angle of the electronic device and the like.

Since the camera may capture one image at one moment, when the camera captures the environment, each acquired image has a corresponding capturing moment. At the same time, since the motion data of the electronic device is instantaneous, the motion data of the electronic device may vary with the moments.

The data alignment unit may align the image captured by the camera with the motion data detected by the motion sensor to determine the instantaneous motion data of the electronic device when the camera captures each image.

The data analyzing unit may analyze the images and the motion data of the electronic device, which are aligned by the data alignment unit, to acquire three-dimensional spatial data of the environment. Subsequently, the data analyzing unit transmits the acquired three-dimensional spatial data to the data packaging unit.

Furthermore, the data alignment unit may transmit the image data after the alignment operation to the data packaging unit. The data packaging unit may package the image data with the three-dimensional spatial data to generate the environment model of the environment. The environment model may be a three-dimensional model.

In one or more embodiments, the environment model includes a plurality of types of data. For example, the environment model includes image data, and spatial coordinate data. The data classifying unit may classify the different types of data to generate a plurality of data interfaces. Different data interfaces for different types of data may be called by different applications.

Figure 2:
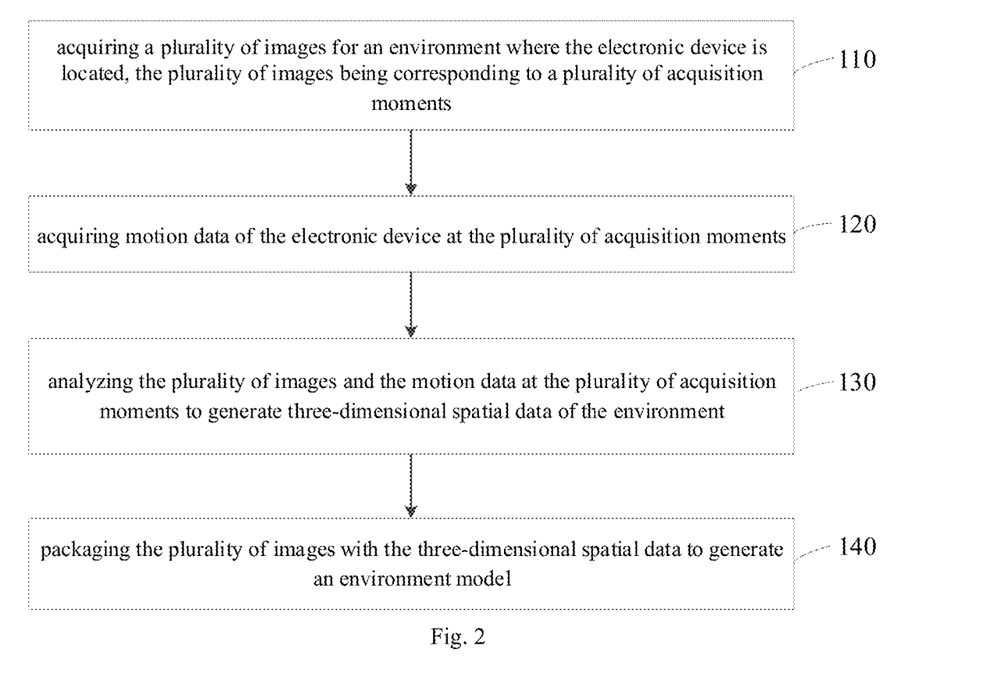
FIG. 2 is a flow chart illustrating a method for generating an environment model according to an embodiment of the present disclosure.

The embodiments of the present disclosure provide a method for generating an environment model. The method for generating an environment model may be applicable to an electronic device. The electronic device may be a device such as a smart phone or a tablet computer. As illustrated in FIG. 2, the method for generating an environment model includes actions in the following blocks.

At block 110, a plurality of images is acquired for an environment where the electronic device is located. The plurality of images is corresponding to a plurality of acquisition moments.

In one or more embodiments, the electronic device may include a camera. The electronic device may capture the environment where the electronic device is located via the camera, thereby acquiring the plurality of images for the environment where the electronic device is located.

In one or more embodiments, the capturing moments of the plurality of images may be intermittent, for example, an interval between two adjacent images may be 10 minutes. In one or more embodiments, the capturing moments of the plurality of images may be continuous. For example, the electronic device may record a video of the environment where the electronic device is located, and the plurality of images acquired in this manner are continuous. Therefore, each of the plurality of images acquired by the electronic device corresponds to one acquisition moment, i.e., one capturing moment.

In one or more embodiments, the environment where the electronic device is located may be any environment such as an office, a supermarket, a movie theater, a street, an attraction, or the like. When the user is using the electronic device, the environment where the electronic device is located is the environment where the user is located.

At block 120, motion data of the electronic device at the plurality of acquisition moments is acquired.

In one or more embodiments, the electronic device may include a motion sensor. The motion sensor may include, but be not limited to, a gyroscope, an acceleration sensor, and the like. The electronic device may acquire the motion data of the electronic device at the acquisition moment of each image via the motion sensor.

In one or more embodiments, the motion data may include speed data such as an acceleration, an angular velocity, and an angular acceleration of the electronic device, and may also include posture data such as a placement direction and an inclination angle of the electronic device, and may also include data such as a height at which the electronic device is located.

At block 130, the plurality of images and the motion data at the plurality of acquisition moments are analyzed to generate three-dimensional spatial data of the environment.

After the electronic device acquires the plurality of images and the motion data of the electronic device at a moment of acquiring each of the plurality of images, the plurality of images and the motion data corresponding to the acquisition moment of each of the plurality of images are analyzed to generate the three-dimensional spatial data of the environment.

The three-dimensional spatial data represents the environment where the electronic device is located by means of data. Through the three-dimensional spatial data, the spatial condition of each point in the environment where the electronic device is located may be known. For example, the following may be expressed by the three-dimensional spatial data, such as whether there is an obstacle at 10 m (meters) in front of the electronic device, the shape of the obstacle, the shape of the object at 0.5 m below the electronic device.

At block 140, the plurality of images is packaged with the three-dimensional spatial data to generate an environment model.

After the electronic device generates the three-dimensional spatial data of the environment, the plurality of images may be packaged with the three-dimensional spatial data. That is, the plurality of images is combined into the three-dimensional spatial data to generate the environmental model of the environment.

The environment model may visually represent an image of each point in the environment where the electronic device is located. For example, color of the obstacle at 10 m in front of the electronic device, text written on a desktop under the electronic device. The above case may be visually expressed by the environment model.

Figure 3:
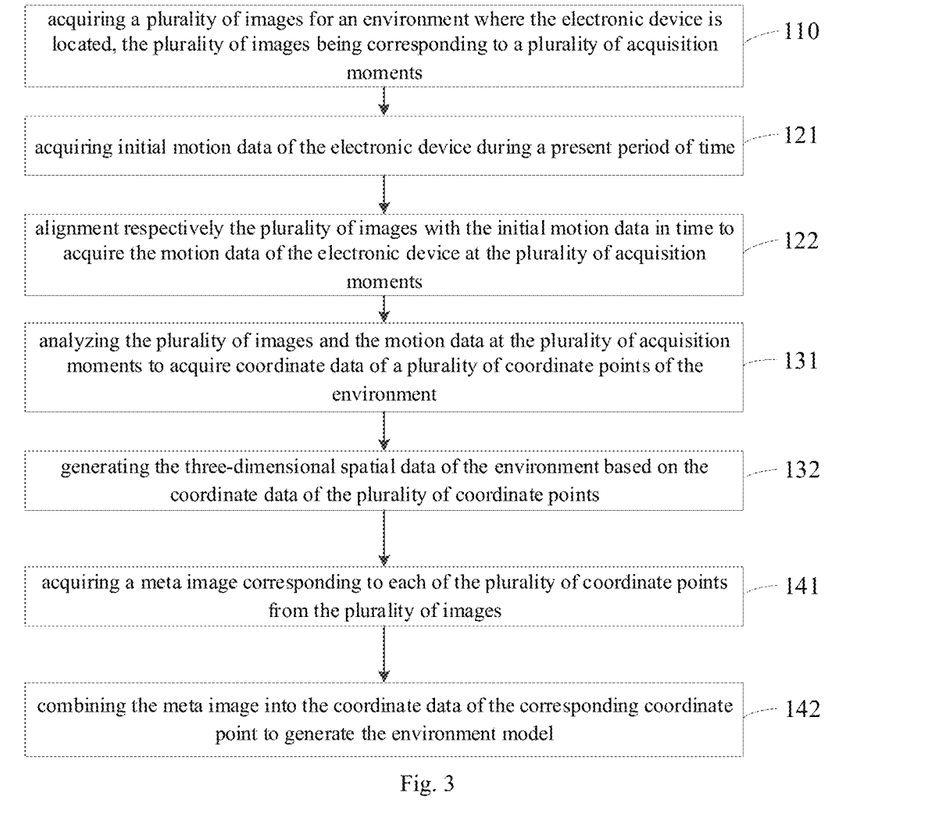
FIG. 3 is a flow chart illustrating a method for generating an environment model according to another embodiment of the present disclosure.

In some embodiments, as illustrated in FIG. 3, the action in block 120, i.e., acquiring the motion data of the electronic device at the plurality of acquisition moments, may include actions in the following blocks.

At block 121, initial motion data of the electronic device is acquired by using the motion sensor.

At block 122, each of the plurality of images is aligned with the initial motion data in terms of time to acquire the motion data of the electronic device at each acquisition moment.

The electronic device may include a motion sensor. The electronic device may acquire the initial motion data of the electronic device via the motion sensor. The motion sensor may continuously acquire motion data of the electronic device over a period of time. For example, the motion sensor may continuously acquire motion data of the electronic device within one hour. The initial motion data is continuously acquired by the motion sensor.

Subsequently, the electronic device may align each of the plurality of images with the initial motion data in terms of time, respectively. Each of the plurality of images corresponds to one acquisition moment, i.e., one capturing moment. Each of the plurality of images is aligned with the initial motion data in terms of time, i.e., the instantaneous motion data of the electronic device at a moment of capturing of each of the plurality of images is determined. Thereby, the motion data of the electronic device at a moment when each of the plurality of images is captured may be acquired.

In some embodiments, the motion data of the electronic device at the plurality of acquisition moments is acquired simultaneously when acquiring the plurality of images. That is, the plurality of images and the motion data of the electronic device at the plurality of acquisition moments are acquired by a series of sensors simultaneously.

In some embodiments, as illustrated in FIG. 3, the action in block 130, i.e., analyzing the plurality of images and the motion data at the plurality of acquisition moments to generate the three-dimensional spatial data of the environment, may include actions in the following blocks.

At block 131, the plurality of images and the motion data at the plurality of acquisition moments are analyzed to acquire coordinate data of a plurality of coordinate points of the environment.

At block 132, the three-dimensional spatial data of the environment is generated based on the coordinate data of the plurality of coordinate points.

The electronic device may separately analyze the plurality of images and the motion data corresponding to the acquisition moment of each of the plurality of images. The electronic device may determine the same object or the same coordinate point from the plurality of images, and determine the motion condition of the electronic device during capturing the plurality of images based on the motion data corresponding to each image, thereby acquiring coordinate data of the object or the coordinate point.

For example, the electronic device may determine the same coordinate point from two images. There is a time difference (i.e., a time interval) between the capturing moments of the two images. The electronic device determines a displacement within the time difference. A moving direction and a moving amount of the electronic device within the time difference may be known based on the displacement. Therefore, the electronic device may acquire relative coordinates between the coordinate point and the electronic device, i.e., acquire the coordinate data of the coordinate point.

The electronic device may analyze the plurality of images and the motion data of the electronic device at a moment of acquiring each of the plurality of images to acquire coordinate data of the plurality of coordinate points. For example, the electronic device may acquire coordinate data of 10,000 coordinate points. Then, the three-dimensional spatial data of the environment is generated based on the acquired coordinate data of the plurality of the coordinate points.

In some embodiments, as illustrated in FIG. 3, the action in block 140, i.e., packaging the plurality of images with the three-dimensional spatial data to generate an environment model, may include actions in the following blocks.

At block 141, a meta image corresponding to each of the plurality of coordinate points is acquired from the plurality of images.

At block 142, the meta image is combined into the coordinate data of the corresponding coordinate point to generate the environment model.

The electronic device may analyze the plurality of images to acquire the meta image corresponding to each of the coordinate points from the plurality of images. The meta image may be understood as the smallest image unit. The meta image corresponding to the coordinate point represents an image at the coordinate point in the environment. A set of meta images at all coordinate points in each image constitutes this image.

Subsequently, the electronic device may combine each of the meta images into coordinate data of the coordinate point corresponding to this meta image to generate the environment model of the environment. For example, if the electronic device acquires 10,000 coordinate points, the electronic device may acquire a meta image corresponding to each of the 10000 coordinate points from the plurality of images, and combine the meta image corresponding to each coordinate point to the coordinate data of the corresponding coordinate point. When the coordinate data of all coordinate points are combined with the corresponding meta images, the environment model may be acquired.

Figure 4:
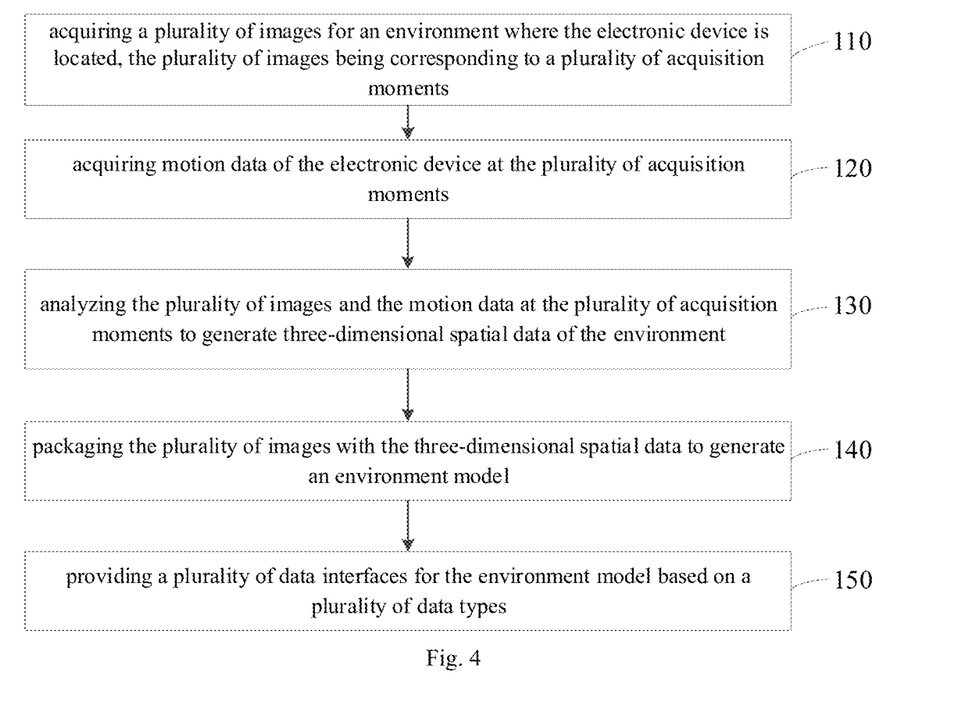
FIG. 4 is a flow chart illustrating a method for generating an environment model according to still another embodiment of the present disclosure.

In some embodiments, as illustrated in FIG. 4, after the action in block 140, i.e., packaging the plurality of images with the three-dimensional spatial data to generate the environment model, the method may include action in the following blocks.

At block 150, data in the environment model is classified based on a plurality of data types to generate a plurality of data interfaces.

The environment model includes a plurality types of data. For example, the environment model includes image data, spatial coordinate data, and coordinate point statistical data. The electronic device may classify the data in the environment model based on the data types to generate the plurality of data interfaces. For example, an image data interface, a spatial coordinate data interface, and a coordinate point statistical data interface may be generated for different applications to invoke.

In specific implementation, the present disclosure is not limited by the order of execution of the various actions described, and in the case where no conflict occurs, some actions may be performed in other orders or simultaneously.

It can be seen from the above that, the method for generating an environment model provided in embodiments of the present disclosure includes the following. A plurality of images is acquired for an environment where the electronic device is located. The plurality of images is corresponding to a plurality of acquisition moments. Motion data of the electronic device is acquired at the plurality of acquisition moments. The plurality of images and the motion data at the plurality of acquisition moments are analyzed to generate three-dimensional spatial data of the environment. The plurality of images is packaged with the three-dimensional spatial data to generate an environment model. With the method for generating an environment model, the environment model may be generated based on the plurality of acquired images and the motion data of the electronic device at the plurality of acquisition moments. Therefore, the environment model may be established based on the environment where the electronic device is located, and the surrounding real-world environment may be efficiently recognized by the established environment model.

Embodiments of the present disclosure further provide an apparatus for generating an environment model. The apparatus is applicable to an electronic device. The electronic device may be a device such as a smart phone or a tablet computer.

Figure 5:
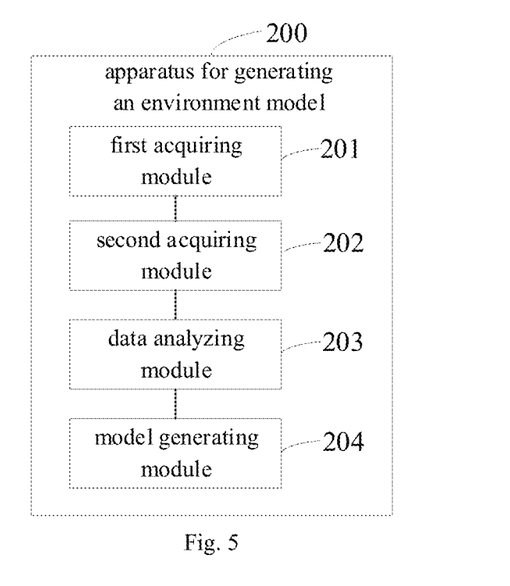
FIG. 5 is a first block diagram illustrating an apparatus for generating an environment model according to an embodiment of the present disclosure.

As illustrated in FIG. 5, the apparatus 200 for generating an environment model may include a first acquiring module 201, a second acquiring module 202, a data analyzing module 203 and a model generating module 204.

The first acquiring module 201 is configured to acquire a plurality of images for an environment where the electronic device is located. The plurality of images is corresponding to a plurality of acquisition moments.

In one or more embodiments, the electronic device may include a camera. The first acquiring module 201 may capture the environment where the camera is located via the camera, thereby acquiring the plurality of images for the environment where the electronic device is located.

In one or more embodiments, the capturing moments of the plurality of images may be intermittent, for example, an interval between two adjacent images may be 10 minutes. In one or more embodiments, the capturing moments of the plurality of images may be continuous. For example, the electronic device may record a video of the environment where the camera is located, and the plurality of images acquired in this manner are continuous. Therefore, each of the plurality of images acquired by the electronic device corresponds to one acquisition moment, i.e., one capturing moment.

In one or more embodiments, the environment where the electronic device is located may be any environment such as an office, a supermarket, a movie theater, a street, an attraction, or the like. When the user is using the electronic device, the environment where the electronic device is located is the environment where the user is located.

The second acquiring module 202 is configured to acquire motion data of the electronic device at the plurality of acquisition moments.

In one or more embodiments, the electronic device may include a motion sensor. The motion sensor may include, but be not limited to, a gyroscope, an acceleration sensor, and the like. The second acquiring module 202 may acquire the motion data of the electronic device at the acquisition moment of each image via the motion sensor.

In one or more embodiments, the motion data may include speed data such as an acceleration, an angular velocity, and an angular acceleration of the electronic device, and may also include posture data such as a placement direction and an inclination angle of the electronic device, and may also include data such as a height at which the electronic device is located.

The data analyzing module 203 is configured to analyze the plurality of images and the motion data at the plurality of acquisition moments to generate three-dimensional spatial data of the environment.

After the electronic device acquires the plurality of images and the motion data of the electronic device at a moment of acquiring each of the plurality of images, the data analyzing module 203 may analyze the plurality of images and the motion data corresponding to the acquisition moment of each of the plurality of images to generate the three-dimensional spatial data of the environment.

The three-dimensional spatial data represents the environment where the electronic device is located by means of data. Through the three-dimensional spatial data, the spatial condition of each point in the environment where the electronic device is located may be known. For example, the following may be expressed by the three-dimensional spatial data, such as whether there is an obstacle at 10 m (meters) in front of the electronic device, the shape of the obstacle, the shape of the object at 0.5 m below the electronic device.

The model generating module 204 is configured to package the plurality of images with the three-dimensional spatial data to generate an environment model.

After the data analyzing module 203 generates the three-dimensional spatial data of the environment, the plurality of images may be packaged with the three-dimensional spatial data. That is, the plurality of images is combined into the three-dimensional spatial data to generate the environmental model of the environment.

The environment model may visually represent an image of each point in the environment where the electronic device is located. For example, color of the obstacle at 10 m in front of the electronic device, text written on a desktop under the electronic device. The above case may be visually expressed by the environment model.

Figure 6:
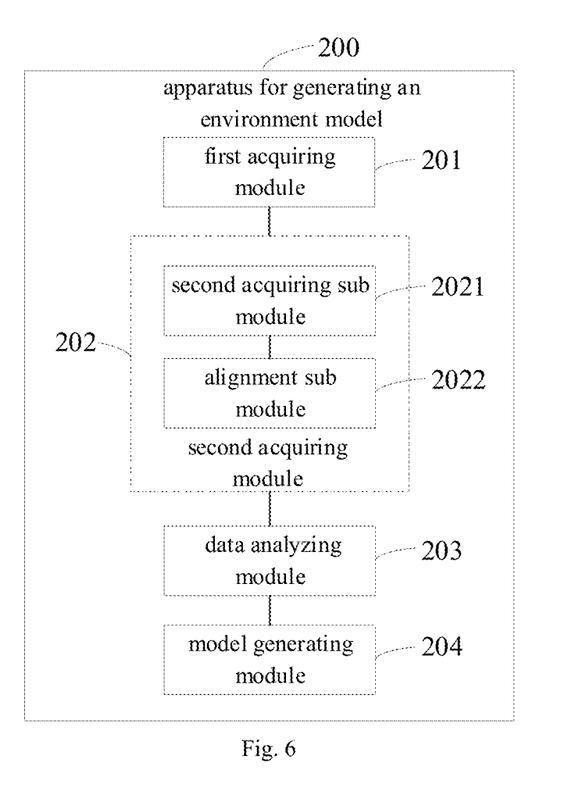
FIG. 6 is a second block diagram illustrating an apparatus for generating an environment model according to an embodiment of the present disclosure.

In some embodiments, as illustrated in FIG. 6, the second acquiring module 202 may include a second acquiring sub module 2021 and an alignment sub module 2022.

The second acquiring sub module 2021 is configured to acquire initial motion data of the electronic device during a present period of time.

The alignment sub module 2022 is configured to align respectively the plurality of images with the initial motion data in time to acquire the motion data of the electronic device at the plurality of acquisition moments.

The electronic device may include a motion sensor. The second acquiring sub module 2021 may acquire the initial motion data of the electronic device via the motion sensor. The motion sensor may continuously acquire motion data of the electronic device over a period. For example, the motion sensor may continuously acquire motion data of the electronic device within one hour. The initial motion data is continuously acquired by the motion sensor.

Subsequently, the alignment sub module 2022 may align each of the plurality of images with the initial motion data in terms of time, respectively. Each of the plurality of images corresponds to one acquisition moment, i.e., one capturing moment. Each of the plurality of images is aligned with the initial motion data in terms of time, i.e., the instantaneous motion data of the electronic device at a moment of capturing of each of the plurality of images is determined. Thereby, the motion data of the electronic device at a moment when each of the plurality of images is captured may be acquired.

In some embodiments, the second acquiring module 202 is configured to acquire the motion data of the electronic device at the plurality of acquisition moments simultaneously when the plurality of images is acquired.

Figure 7:
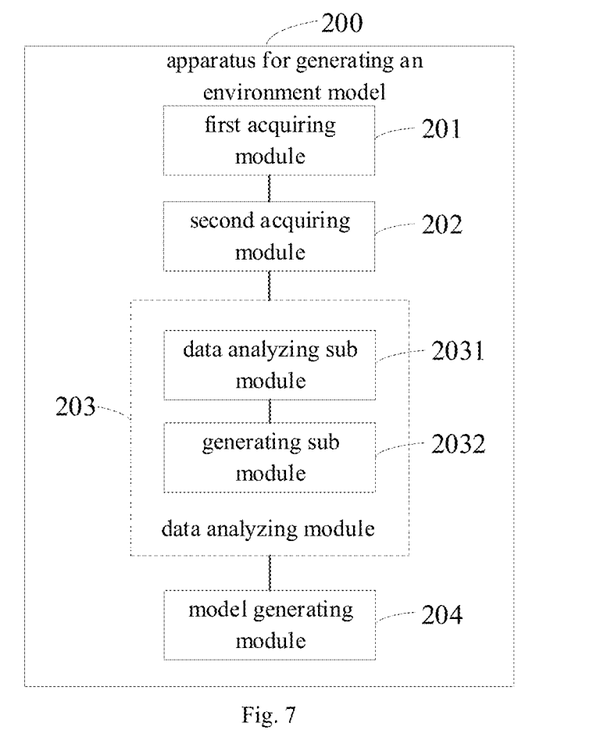
FIG. 7 is a third block diagram illustrating an apparatus for generating an environment model according to an embodiment of the present disclosure.

In some embodiments, as illustrated in FIG. 7, the data analyzing module 203 may include a data analyzing sub module 2031 and a generating sub module 2032.

The data analyzing sub module 2031 is configured to analyze the plurality of images and the motion data at the plurality of acquisition moments to acquire coordinate data of a plurality of coordinate points of the environment.

The generating sub module 2032 is configured to generate the three-dimensional spatial data of the environment based on the coordinate data of the plurality of coordinate points.

The data analyzing sub module 2031 may separately analyze the plurality of images and the motion data corresponding to the acquisition moment of each of the plurality of images. The data analyzing sub module 2031 may determine the same object or the same coordinate point from the plurality of images, and determine the motion condition of the electronic device during capturing the plurality of images based on the motion data corresponding to each image, thereby acquiring coordinate data of the object or the coordinate point.

For example, the data analyzing sub module 2031 may determine the same coordinate point from two images. There is a time difference between the capturing moments of the two images. The data analyzing sub module 2031 determines a displacement within the time difference. A moving direction and a moving amount of the electronic device within the time difference may be known based on the displacement. Therefore, the data analyzing sub module 2031 may acquire relative coordinates between the coordinate point and the electronic device, i.e., acquire the coordinate data of the coordinate point.

The data analyzing sub module 2031 may analyze the plurality of images and the motion data of the electronic device at a moment of acquiring each of the plurality of images to acquire coordinate data of the plurality of coordinate points. For example, the data analyzing sub module 2031 may acquire coordinate data of 10,000 coordinate points. Then, the generating sub module 2032 may generate the three-dimensional spatial data of the environment based on the acquired coordinate data of the plurality of the coordinate points.

Figure 8:
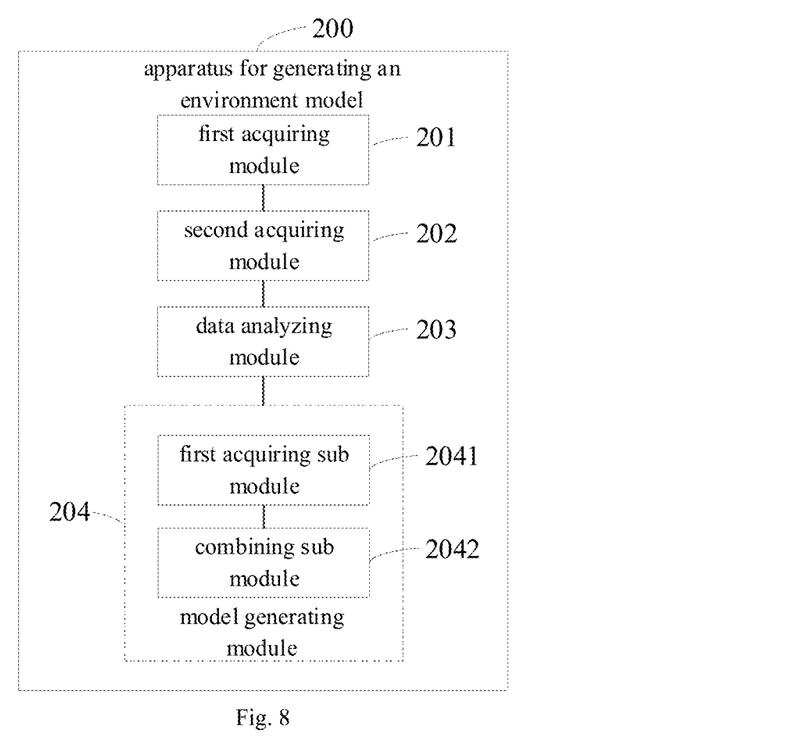
FIG. 8 is a fourth block diagram illustrating an apparatus for generating an environment model according to an embodiment of the present disclosure.

In some embodiments, as illustrated in FIG. 8, the model generating module 204 may include a first acquiring sub module 2041 and a combining sub module 2042.

The first acquiring sub module 2041 is configured to acquire a meta image corresponding to each of the plurality of coordinate points from the plurality of images.

The combining sub module 2042 is configured to combine the meta image into the coordinate data of the corresponding coordinate point to generate the environment model.

The first acquiring sub module 2041 may analyze the plurality of images to acquire a meta image corresponding to each of the coordinate points from the plurality of images. The meta image may be understood as the smallest image unit. The meta image corresponding to the coordinate point represents an image at the coordinate point in the environment. A set of meta images at all coordinate points in each image constitutes this image.

Subsequently, the combining sub module 2042 may combine each of the meta images into coordinate data of the coordinate point corresponding to this meta image to generate the environment model of the external environment. For example, if the data analyzing module 203 acquires 10,000 coordinate points, the first acquiring sub module 2041 may acquire a meta image corresponding to each of the 10000 coordinate points from the plurality of images, and the combining sub module 2042 combine the meta image corresponding to each coordinate point to the coordinate data of the corresponding coordinate point. When the coordinate data of all coordinate points are combined with the corresponding meta images, the environment model of the external environment may be acquired.

Figure 9:
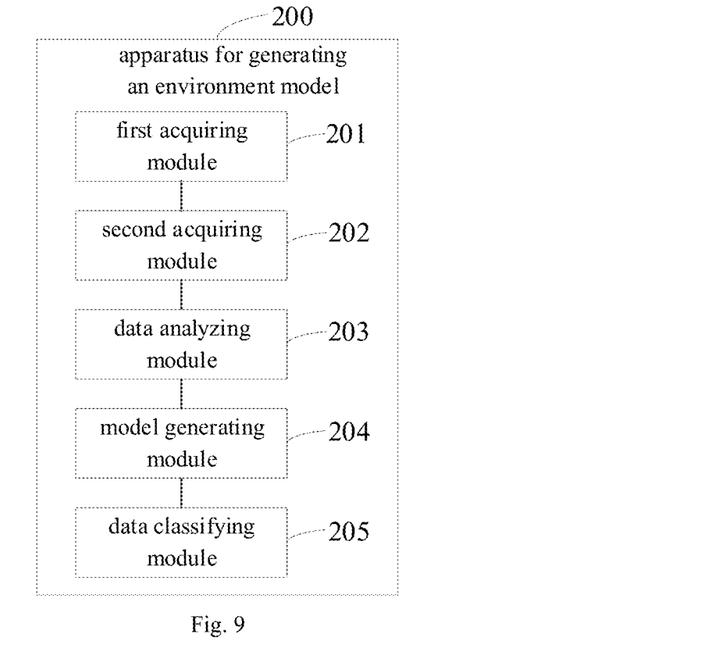
FIG. 9 is a fifth block diagram illustrating an apparatus for generating an environment model according to an embodiment of the present disclosure.

In some embodiments, as illustrated in FIG. 9, the apparatus 200 further includes a data classifying module 205.

The data classifying module 205 is configured to classify data in the environment model based on a plurality of data types to generate a plurality of data interfaces.

The environment model includes a plurality types of data. For example, the environment model includes image data, spatial coordinate data, and coordinate point statistical data. The data classifying module 205 may classify the data in the environment model based on the data types to generate the plurality of data interfaces. For example, an image data interface, a spatial coordinate data interface, and a coordinate point statistical data interface may be generated for different applications to invoke.

In specific implementation, each of the above modules may be implemented as a separate entity, or may be implemented in any combination as one or several entities.

It can be seen from the above that, with the apparatus 200 for generating an environment model provided in embodiments of the present disclosure, a plurality of images is acquired by the first acquiring module 201 for an environment where the electronic device is located. The plurality of images is corresponding to a plurality of acquisition moments. The motion data of the electronic device is acquired by the second acquiring module 202 at the plurality of acquisition moments. The plurality of images and the motion data at the plurality of acquisition moments are analyzed by the data analyzing module 203 to generate the three-dimensional spatial data of the environment. The plurality of images is packaged by the model generating module 204 with the three-dimensional spatial data to generate the environment model. With the apparatus for generating an environment model, the environment model may be generated based on the plurality of acquired images and the motion data of the electronic device at the plurality of acquisition moments. Therefore, the environment model may be established based on the environment where the electronic device is located, and the surrounding real-world environment may be efficiently recognized by the established environment model.

Figure 10:
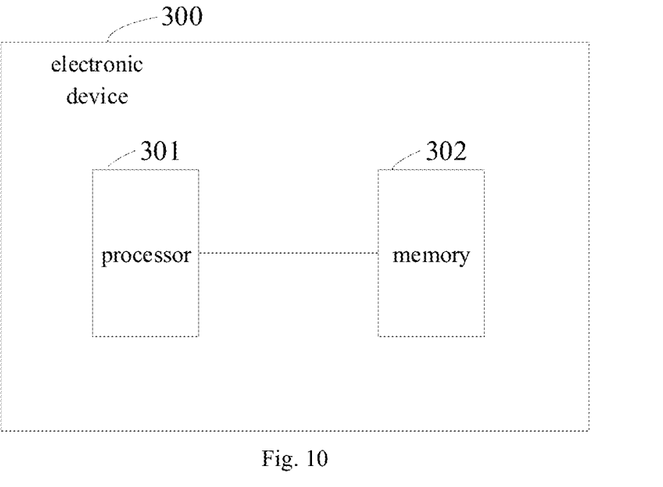
FIG. 10 is a block diagram illustrating an electronic device according to an embodiment of the present disclosure.

Embodiments of the present disclosure further provide an electronic device. The electronic device may be a device such as a smart phone or a tablet computer. As illustrated in FIG. 10, the electronic device 300 may include a processor 301 and a memory 302. The processor 301 is electrically coupled to the memory 302.

The processor 301 is a control center of the electronic device 300, which connects various parts of the entire electronic device 300 using various interfaces and lines, and perform various functions and process data of the electronic device 300 by running or invoking computer programs stored in the memory 302 and invoking data stored in the memory 302, thereby performing overall monitoring of the electronic device 300.

In this embodiment, the processor 301 in the electronic device 300 may load the instruction corresponding to the process of one or more computer programs into the memory 302 and run the one or more computer programs stored in the memory 302, thereby implementing various following functions.

A plurality of images is acquired for an environment where the electronic device is located. The plurality of images is corresponding to a plurality of acquisition moments.

Motion data of the electronic device is acquired at the plurality of acquisition moments.

The plurality of images and the motion data at the plurality of acquisition moments are analyzed to generate three-dimensional spatial data of the environment.

The plurality of images is packaged with the three-dimensional spatial data to generate an environment model.

In some embodiments, when the plurality of images and the motion data at the plurality of acquisition moments are analyzed to generate the three-dimensional spatial data of the environment, the processor 301 is configured to perform the following actions.

The plurality of images and the motion data at the plurality of acquisition moments are analyzed to acquire coordinate data of a plurality of coordinate points of the environment.

The three-dimensional spatial data of the environment is generated based on the coordinate data of the plurality of coordinate points.

In some embodiments, when the plurality of images is packaged with the three-dimensional spatial data to generate the environment model, the processor 301 is configured to perform the following actions.

A meta image corresponding to each of the plurality of coordinate points is acquired from the plurality of images.

The meta image is combined into the coordinate data of the corresponding coordinate point to generate the environment model.

In some embodiments, the electronic device includes a motion sensor. When the motion data of the electronic device at the plurality of acquisition moments is acquired, the processor 301 is configured to perform the following actions.

Initial motion data of the electronic device is acquired by using the motion sensor.

The plurality of images is aligned respectively with the initial motion data in terms of time to acquire the motion data of the electronic device at the plurality of acquisition moments.

In some embodiments, after the plurality of images are packaged with the three-dimensional spatial data to generate the environment model, the processor 301 is further configured to perform the following actions.

Data in the environment model is classified based on a plurality of data types to generate a plurality of data interfaces.

The memory 302 may be configured to store computer programs and data. The computer programs stored in memory 302 may include instructions that are executable in the processor 301. The computer programs may be combined into various functional modules. The processor 301 may execute various functional applications and data processing by invoking the computer programs stored in the memory 302.

Figure 11:
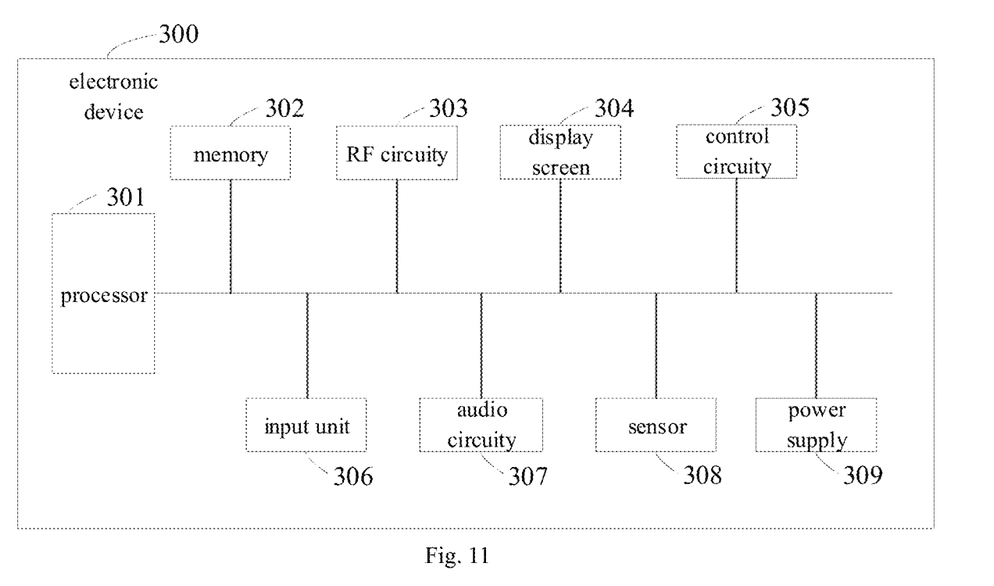
FIG. 11 is a block diagram illustrating an electronic device according to another embodiment of the present disclosure.

In some embodiments, as illustrated in FIG. 11, the electronic device 300 further includes a radio frequency (RF) circuitry 303, a display screen 304, a control circuitry 305, an input unit 306, an audio circuitry 307, a sensor 308 and a power supply 309. The processor 301 is electrically coupled to the radio frequency (RF) circuitry 303, the display 304, the control circuitry 305, the input unit 306, the audio circuitry 307, the sensor 308 and the power supply 309.

The RF circuitry 303 is configured to receive and transmit radio frequency signals to communicate with network devices or other electronic devices through wireless communication.

The display screen 304 is configured to display information inputted by a user or information provided to a user, as well as various graphical user interfaces of the electronic device. The graphical user interfaces may be composed of images, text, icons, videos, and any combination thereof.

The control circuitry 305 is electrically connected to the display screen 304 for controlling the display screen 304 to display information.

The input unit 306 is configured to receive input digits, character information, or user characteristic information (e.g., fingerprints), and to generate a keyboard, a mouse, a joystick, an optical or trackball signal related to user settings and function controls. The input unit 306 may include a fingerprint recognition module.

The audio circuitry 307 may provide an audio interface between the user and the electronic device through a speaker and a microphone.

The sensor 308 is configured to collect external environment information. The sensor 308 may include one or more of an ambient brightness sensor, an acceleration sensor, a gyroscope, and the like.

The power supply 309 is configured to power various components of the electronic device 300. In some embodiments, the power supply 309 may be logically coupled to the processor 301 through a power management system, such that the power management system may implement functions such as managing charging, discharging, and power management.

Although not illustrated in FIG. 11, the electronic device 300 may further include a camera, a Bluetooth module, and the like, and details are not described herein.

It can be seen from the above that, embodiments of the present disclosure further provide the electronic device. The electronic device is configured to perform the following actions. A plurality of images is acquired for an environment where the electronic device is located. The plurality of images is corresponding to a plurality of acquisition moments. Motion data of the electronic device is acquired at the plurality of acquisition moments. The plurality of images and the motion data at the plurality of acquisition moments are analyzed to generate three-dimensional spatial data of the environment. The plurality of images is packaged with the three-dimensional spatial data to generate an environment model. With the electronic device, the environment model may be generated based on the plurality of acquired images and the motion data of the electronic device at the plurality of acquisition moments. Therefore, the environment model may be established based on the environment where the electronic device is located, and the surrounding real-world environment may be efficiently recognized by the established environment model.

Embodiments of the present disclosure further provide a storage medium having stored computer programs thereon. When the computer programs are running in a computer, the computer is caused to implement the method of any above embodiment.

Those skilled in the art should understand that all or part of the actions in the above blocks in the methods in embodiments may be implemented by instructing relevant hardware via a computing program. The computing program may be stored in a computer readable memory. The computer readable memory may include a flash drive, a read-only memory (ROM), a random access memory (RAM), a magnetic disk, an optical disk or the like.

The method for generating an environment model, the apparatus for generating an environment model, the storage medium and the electronic device provided in embodiments of the present disclosure are described in detail above. Specific examples are used herein to describe the principles and implementation manners of the present disclosure. The description of the above embodiments is merely used to help understand the method and key idea of the present disclosure. Meanwhile, those skilled in the art may make modifications to the detailed description and application scopes according to ideas of the present disclosure. In view of the above descriptions, the specification should not be construed as limiting the present disclosure.

What is claimed is:

1. A method for generating an environment model, the method being applicable to an electronic device and comprising:
   acquiring a plurality of images for an environment where the electronic device is located, the plurality of images being corresponding to a plurality of acquisition moments;
   acquiring motion data of the electronic device at the plurality of acquisition moments;
   analyzing the plurality of images and the motion data at the plurality of acquisition moments to generate three-dimensional spatial data of the environment, comprising: analyzing the plurality of images and the motion data at the plurality of acquisition moments to acquire coordinate data of a plurality of coordinate points of the environment, and generating the three-dimensional spatial data of the environment based on the coordinate data of the plurality of coordinate points; in which analyzing the plurality of images and the motion data at the plurality of acquisition moments to acquire the coordinate data of a plurality of coordinate points of the environment, comprises: determining a same coordinate point from two images, the two images being selected from the plurality of images, determining a time interval of the two images, determining a moving direction and an amount of moving based on motion data during the time interval, the motion data during the time interval being selected from the motion data at the plurality of acquisition moments correspondingly, determining relative coordinates between the same coordinate point and the electronic device based on the moving direction and the amount of moving, and determining a coordinate data of the same coordinate point based on the relative coordinates;
   packaging the plurality of images with the three-dimensional spatial data to generate an environment model, comprising: acquiring a meta image corresponding to each of the plurality of coordinate points from the plurality of images, and combining the meta image into the coordinate data of the corresponding coordinate point to generate the environment model;
   providing a plurality of data interfaces for the environment model based on the plurality of data types; and
   invoking the plurality of data interfaces by different applications.

2. The method of claim 1, wherein, acquiring the motion data of the electronic device at the plurality of acquisition moments, comprises:
   acquiring initial motion data of the electronic device during a present period of time; and
   alignment respectively the plurality of images with the initial motion data in time to acquire the motion data of the electronic device at the plurality of acquisition moments.

3. The method of claim 1, wherein, acquiring the motion data of the electronic device at the plurality of acquisition moments, comprises:
   when acquiring the plurality of images, acquiring the motion data of the electronic device at the plurality of acquisition moments simultaneously.

4. An electronic device, comprising a memory and a processor, wherein the memory is configured to store computer programs, and the processor is configured to, by invoking the computer programs stored in the memory, implement the following actions:
   acquiring a plurality of images for an environment where the electronic device is located, the plurality of images being corresponding to a plurality of acquisition moments;
   acquiring motion data of the electronic device at the plurality of acquisition moments;
   analyzing the plurality of images and the motion data at the plurality of acquisition moments to generate three-dimensional spatial data of the environment, comprising: analyzing the plurality of images and the motion data at the plurality of acquisition moments to acquire coordinate data of a plurality of coordinate points of the environment, and generating the three-dimensional spatial data of the environment based on the coordinate data of the plurality of coordinate points; in which analyzing the plurality of images and the motion data at the plurality of acquisition moments to acquire the coordinate data of a plurality of coordinate points of the environment, comprises: determining a same coordinate point from two images, the two images being selected from the plurality of images, determining a time interval of the two images, determining a moving direction and an amount of moving based on motion data during the time interval, the motion data during the time interval being selected from the motion data at the plurality of acquisition moments correspondingly, determining relative coordinates between the same coordinate point and the electronic device based on the moving direction and the amount of moving, and determining a coordinate data of the same coordinate point based on the relative coordinates;

packaging the plurality of images with the three-dimensional spatial data to generate an environment model, comprising: acquiring a meta image corresponding to each of the plurality of coordinate points from the plurality of images, and combining the meta image into the coordinate data of the corresponding coordinate point to generate the environment model;

providing a plurality of data interfaces for the environment model based on a plurality of data types; and invoking the plurality of data interfaces by different applications.

5. The device of claim 4, wherein, acquiring the motion data of the electronic device at the plurality of acquisition moments, comprises:

acquiring initial motion data of the electronic device during a present period of time; and alignment respectively the plurality of images with the initial motion data in time to acquire the motion data of the electronic device at the plurality of acquisition moments.

6. The device of claim 4, wherein, acquiring the motion data of the electronic device at the plurality of acquisition moments, comprises:

when acquiring the plurality of images, acquiring the motion data of the electronic device at the plurality of acquisition moments simultaneously.

7. A non-transitory computer-readable storage medium having stored computer programs thereon, wherein when the computer programs are running in an electronic device, the electronic device is caused to implement the following actions:

acquiring a plurality of images for an environment where the electronic device is located, the plurality of images being corresponding to a plurality of acquisition moments;

acquiring motion data of the electronic device at the plurality of acquisition moments;

analyzing the plurality of images and the motion data at the plurality of acquisition moments to generate three-dimensional spatial data of the environment, comprising: analyzing the plurality of images and the motion data at the plurality of acquisition moments to acquire coordinate data of a plurality of coordinate points of the environment, and generating the three-dimensional spatial data of the environment based on the coordinate data of the plurality of coordinate points; in which analyzing the plurality of images and the motion data at the plurality of acquisition moments to acquire the coordinate data of a plurality of coordinate points of the environment, comprises: determining a same coordinate point from two images, the two images being selected from the plurality of images, determining a time interval of the two images, determining a moving direction and an amount of moving based on motion data during the time interval, the motion data during the time interval being selected from the motion data at the plurality of acquisition moments correspondingly, determining relative coordinates between the same coordinate point and the electronic device based on the moving direction and the amount of moving, and determining a coordinate data of the same coordinate point based on the relative coordinates;

packaging the plurality of images with the three-dimensional spatial data to generate an environment model, comprising: acquiring a meta image corresponding to each of the plurality of coordinate points from the plurality of images, and combining the meta image into the coordinate data of the corresponding coordinate point to generate the environment model;

providing a plurality of data interfaces for the environment model based on a plurality of data types, including an image data interface, a spatial coordinate; and invoking the plurality of data interfaces by different applications.

8. The storage medium of claim 7, wherein, acquiring the motion data of the electronic device at the plurality of acquisition moments, comprises:

acquiring initial motion data of the electronic device during a present period of time; and alignment respectively the plurality of images with the initial motion data in time to acquire the motion data of the electronic device at the plurality of acquisition moments.

9. The storage medium of claim 7, wherein, acquiring the motion data of the electronic device at the plurality of acquisition moments, comprises:

when acquiring the plurality of images, acquiring the motion data of the electronic device at the plurality of acquisition moments simultaneously.

* * * * *